March 27, 1945. W. P. ODOM 2,372,288
NAVIGATION PLOTTING INSTRUMENT
Filed Sept. 23, 1943 2 Sheets-Sheet 1
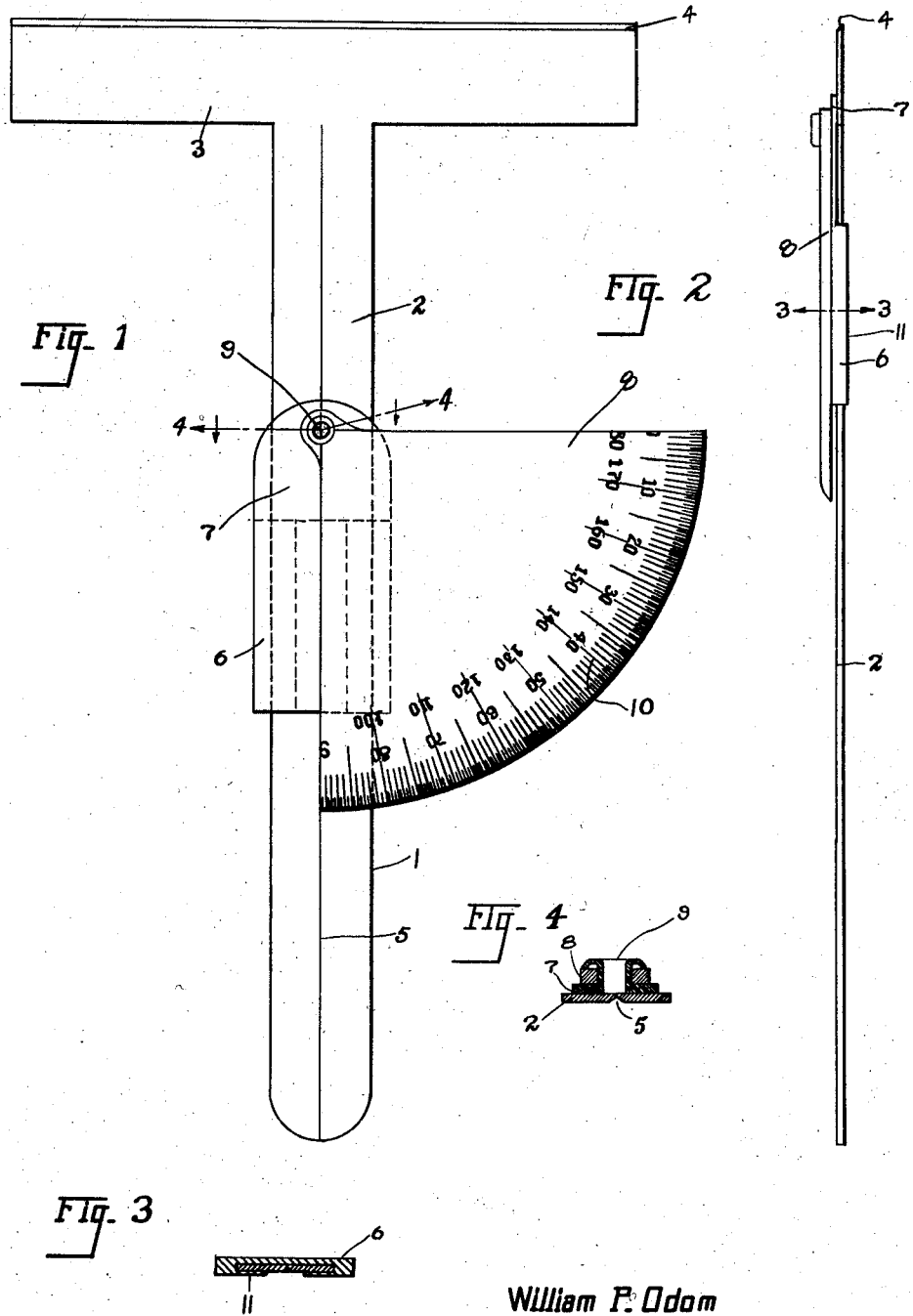
William P. Odom
INVENTOR
BY
ATTORNEY March 27, 1945. W. P. ODOM 2,372,288
NAVIGATION PLOTTING INSTRUMENT
Filed Sept. 23, 1943 2 Sheets-Sheet 2
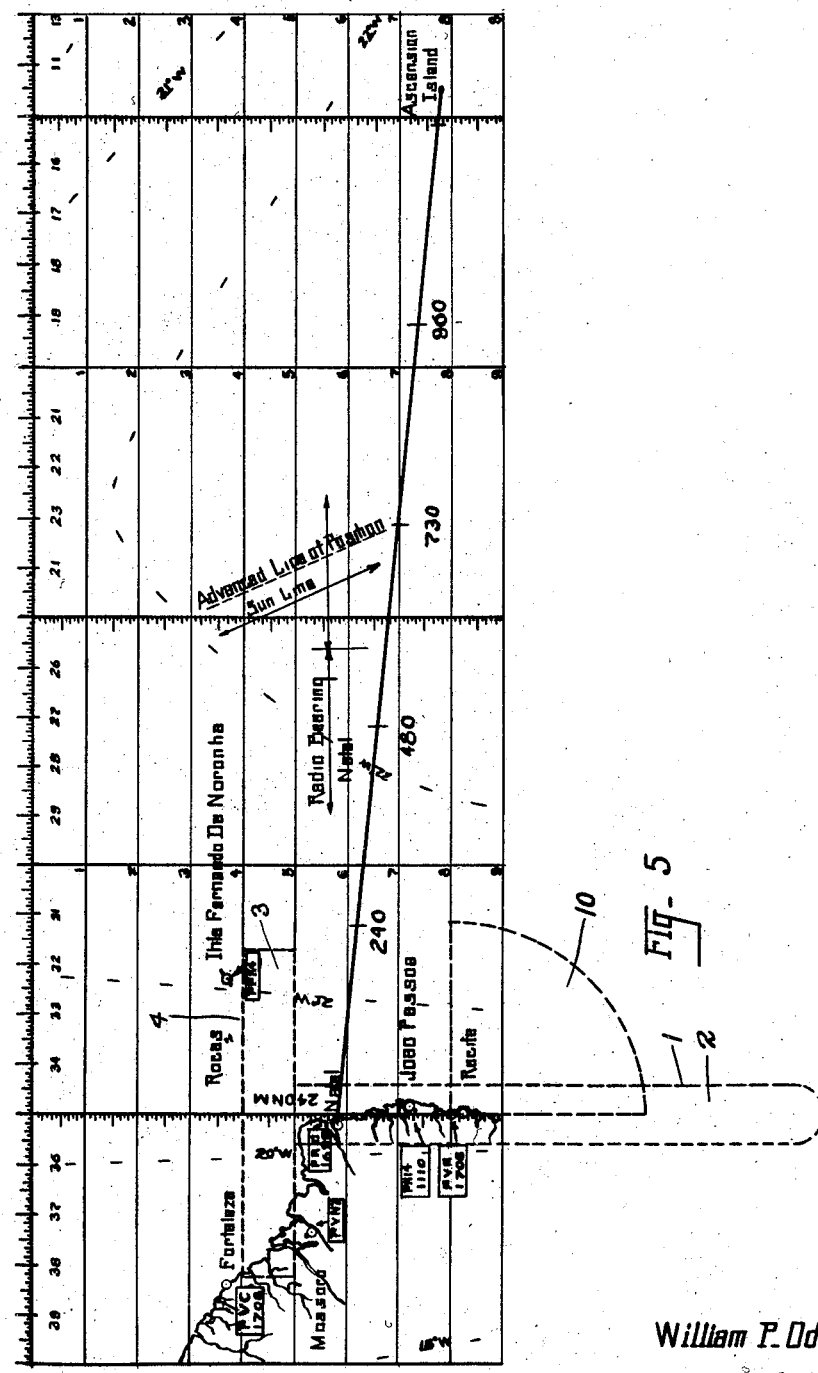
William P. Odom
INVENTOR
BY
ATTORNEY Patented Mar. 27, 1945

2,372,288

UNITED STATES PATENT OFFICE 2,372,288

NAVIGATION PLOTTING INSTRUMENT

William P. Odom, Manhasset, Long Island, N. Y., assignor to The Emeloid Company, Incorporated, Arlington, N. J., a corporation of New Jersey Application September 23, 1943, Serial No. 503,481

3 Claims. (Cl. 33—101)

This invention relates to navigation plotting instruments or navigation plotters, and an object of the present invention is to provide a single instrument or plotter by means of which the navigator in an aeroplane or boat may perform the necessary plotting of celestial and/or radial lines of position and plot courses.

Another object of the present invention is the provision of a navigation plotter which combines in one convenient instrument the functions of dividers, plotters, parallel rulers, straight edge rules, and right triangles used to plot positions in celestial, radial and dead reckoning navigation thereby eliminating the inconveniences contingent with the use of a number of separate instruments when plotting a course on a flying aeroplane or on a ship traveling in a rough sea.

A further object of the present invention is to provide a plotting instrument as specified which because of its construction and geometric principles involved is applicable for use as a drafting instrument.

With these and other objects in view, as may appear from the accompanying specification, the invention consists of various features of construction and combination of parts, which will be first described in connection with the accompanying drawings, showing a navigation plotting instrument of a preferred form embodying the invention, and the features forming the invention will be specifically pointed out in the claims.

In the drawings:

Figure 1 is a plan view of the improved navigation plotting instrument.

Figure 2 is an edge elevation of the instrument.

Figure 3 is a cross-section on the line 3—3 of Figure 2.

Figure 4 is a detailed cross-section on the line 4—4 of Figure 1.

Figure 5 is a diagrammatic view illustrating the manner of plotting a course with the improved instrument.

Referring more particularly to the drawings, the navigation plotting instrument comprises a T-bar 1 which is made of any suitable material, preferably of a transparent plastic so that indicia on a navigation chart may be read through the bar. The T-bar 1 includes the body 2 and the right angularly extending head 3 extending across one end of the body 2. If it is so desired, the outer edge 4 of the head 3 may be bevelled for facilitating the marking of a course on a navigation chart.

The body 2 has a line 5 scored on one surface thereof and extending longitudinally thereof exactly on the longitudinal center of the body.

A slide block 6 slidably mounted on the body 2 has an extension 7 formed on one face thereof which extends longitudinally beyond the end of the portion of the slide 6 which extends about the body 2. The end of the extension 7 may be rounded if desired. A graduated quadrant 8 is pivotally connected by a pivoting eyelet 9 to the extension 7 and the axis of the pivot of the quadrant 8 is exactly on the longitudinal center of the body 2 and coincides with the line 5 scored on the body. The extension 7 is of such length that when the end of the slide 6 engages the inner edge of the head 3 of the T-bar 1 the pivotal axis of the quadrant 8 will be on the point bisected by the outer edge of the head 3 and the longitudinal center of the body 2.

The quadrant 8 is graduated as shown at 10 and any number of scales or indicia applicable for use in plotting courses of airplanes or ships or of celestial and radial lines of position relative to a plotted course.

Figure 5 of the drawings shows a navigation chart having laid out thereon the course from Natal to Ascension Island and in flying or sailing from Natal to Ascension Island the improved navigation plotter would be used as follows:

The track or course is measured by using the protractor portion of the instrument.

The distance is measured by setting the instrument, as shown in the diagram (this depends upon the chart used and the distance to be measured), which in this case would be 240 nautical miles, as shown on the diagram, the distance is then laid off along the course as indicated in Figure 5.

To plot celestial lines of position, for example, a sight on the sun, the plotter is set to the distance toward or away from the assumed or dead reckoning position, in the case illustrated in Figure 5, seventy-three nautical miles, then set the azimuth (65° in this example) on the quadrant scale, place the plotter so that the vertex or pivotal point of the quadrant is directly on the dead reckoning or assumed position (6° south, 25° 36' west in this example) and with the edge of the quadrant coinciding with the parallel of latitude and then draw the line of position.

To plot a radio bearing, set the bearing on the scale of the protractor, place the protractor vertex or pivot on the radio station as indicated on the chart, then make a dot at the end of the centerline 5 scored on the body 2 after which connect the station and the dot by drawing a straight line along the edge of the body 2 of the plotting instrument.

To advance a position line, the measuring feature printed on the chart is employed, and in using this measuring feature the plotter lays off the desired distance along the direction of the track or course. Then one edge of the protractor is placed on the parallel of latitude and the slide is pressed firmly against the chart and the T-bar is adjusted relative to the slide to coincide with the line of position, then the instrument is slid along the parallel of latitude until the outer edge of the head 3 is on dot on the track or course line.

By reference to the drawings, it will be noted that the under side 11 of the slide, that is, the side thereof opposite the one under which the protractor moves is flat so that in operation the protractor and the slide may be held rigidly in position on a chart and the T-bar 1 moved relative to the slide and protractor, while the T-bar may also be held in position on a chart and the protractor and slide moved relative to the T-bar, and the protractor moved pivotally relative to the slide.

It will be understood that the invention is not to be limited to the specific construction or arrangement of parts shown, but that they may be widely modified within the invention defined by the claims.

What is claimed is:

1. In a navigation plotting instrument, a T-bar including a body and a right angularly extending head on one end thereof lying in the same plane as the body, a slide mounted on said body and having an extension formed on one end thereof, a quadrant pivotally connected at its vertex to said extension, said extension and pivot arranged whereby when the slide is moved into an abutting engagement with the inner edge of said head, the vertex of the quadrant will be on the line of the outer edge of said head.

2. In a navigation plotting instrument, a T-bar including a body and a right angularly extending head on one end thereof lying in the same plane as the body, a slide mounted on said body and having an extension formed on one end thereof, a quadrant pivotally connected at its vertex to said extension, said extension and pivot arranged whereby when the slide is moved into an abutting engagement with the inner edge of said head, the vertex of the quadrant will be on the line of the outer edge of said head, said body provided with a scored line on one face thereof extending along the exact longitudinal center of the body, the vertex of said quadrant being directly over said centrally scored line.

3. In a navigation plotting instrument, a T-bar made of transparent material including a body and a right angularly extending head on one end of the body and lying in the same plane as the body, a slide mounted on said body, said slide having an extension on the end thereof facing said body head, a quadrant of transparent material pivotally connected to said extension with the axis of its pivotal movement extending through a line longitudinally bisecting said body, said pivot being positioned with respect to the adjacent end of said slide so that when the end of the slide engages the inner edge of said head the pivotal axis of said quadrant will lie on the outer edge of said head.

WILLIAM P. ODOM